18,379,876
Patented Apr. 23, 1968

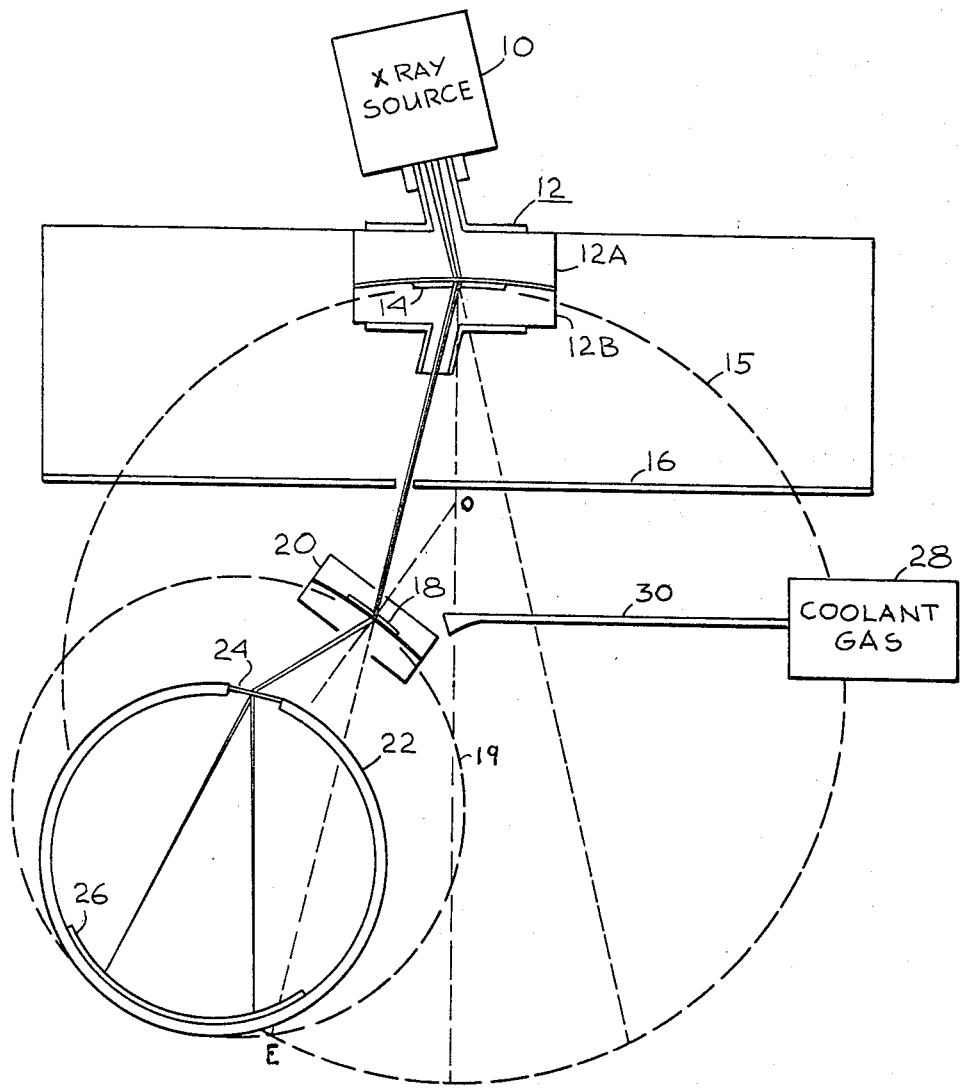

3,379,876
X-RAY DIFFRACTION CAMERA EMPLOYING TWO CURVED CRYSTAL TRANSMISSION TYPE MONOCHROMATORS
Kamalaksha Das Gupta, Pasadena, Calif., assignor, by mesne assignments, to the United States of America as represented by the United States Atomic Energy Commission
Filed May 12, 1965, Ser. No. 455,214
6 Claims. (Cl. 250—51.5)

ABSTRACT OF THE DISCLOSURE

An X-ray diffraction camera is provided which employs two bent crystal monochromators. X-rays from a source are directed at the first one of these curved monochromators. The second monochromator whose curvature is greater than the first is placed in the path of the deflected X-rays from the first monochromator at a predetermined location. The specimen is placed in the path of the X-rays which are passed through the second monochromator. A photograph is made of the diffraction pattern caused by the specimen.

Background of the invention

This invention relates to apparatus for performing an X-ray diffraction and high resolution X-ray spectroscopy, and more particularly to improvements therein.

An object of this invention is to provide an improved X-ray diffraction apparatus which reduces background scattering considerably.

Another object of this invention is the provision of novel X-ray diffraction apparatus which substantially eliminates parasitic scattering.

Yet another object of the present invention is the provision of X-ray diffraction apparatus which provides sharper and clearer results than have been obtained heretofore.

Still another object of the present invention is the provision of a novel and unique X-ray diffraction apparatus for small angle scattering work.

The foregoing and other objects of the invention may be achieved in an arrangement wherein X-rays from a source are directed through two crystal monochromators which are curved in a manner such that the curvature of the crystal closest to the source of X-rays is less than the curvature of the following crystal. The specimen to be diffracted is then placed to receive the X-rays which have passed through the second crystal. The X-ray spectral lines thus derived from the specimen are photographed.

The novel features that are considered characteristic of this invention are set forth with particularity in the appended claims. The invention itself both as to its organization and method of operation, as well as additional objects and advantages thereof, will best be understood from the following description when read in connection with the accompanying drawing, which is a schematic diagram of the embodiment of the invention.

Referring now to the drawing which schematically illustrates an embodiment of the invention, X-rays from a source 10 are directed through an opening in a crystal holder 12 to impinge upon the surface of a crystal monochromator 14. The holder may be made from two pieces of metal respectively 12A, 12B, which have their interface milled to provide the desired curvature for the crystal 14 which is sandwiched between the two parts of the crystal holder 12. Openings are drilled through the top portion 12A and the bottom portion 12B so that the X-rays from the source 10 can impinge upon the curved crystal which serves to produce a focus spectrum of X-rays which would be at the point E, if extended on the circle of curvature (represented by the dashed line circle 15) of the first crystal. The first crystal is made from quartz which has been cut in its $10\bar{1}1$ plane. By way of illustration, and not to serve as a limitation upon the invention, the first crystal was bent to a radius $R=11$ inches. The openings in the specimen holder were made 1 millimeter wide. The assembly was aligned in order to satisfy the Bragg angle of 13.20 for $K\alpha$ copper radiation.

A lead mask 16 having a narrow slit to permit the X-ray beam to pass therethrough is employed. The mask is provided to prevent background radiation from affecting the result.

A second quartz crystal 18 also cut along the $10\bar{1}1$ plane, and held in a crystal holder 20, has a radius of curvature (represented by dashed line circle 19) equal to approximately one-half of the radius of curvature of the crystal 14. The location of crystal 18 relative to crystal 14 may be determined by imagining a circle (not shown) having the radius of the curvature of crystal 18, which imaginary circle is positioned so that crystal 14 is tangent to the periphery thereof. The center O of this imaginary circle is on a line perpendicular to the crystal 14 at the point at which X-rays from the source 10 impinge thereon. Crystal 18 which has the curvature of a circle 19 (the same as the imaginary circle) is positioned at a location where it and the periphery of the imaginary circle intercepts the deflected X-rays which have been passed through the crystal 14. The Bragg angle of 13° 30′ made by the X-rays which have passed through the curved crystal 14 is also made by the X-rays passing through the crystal 18 with a line passing through the center of the curved crystal 18, and the center O of the imaginary circle.

The second crystal 18 receives the X-ray radiation from the first crystal with the associated spectrum. The second crystal may be rotated about a vertical axis which is the line passing through the crystal into the plane of the drawing and the angle which is made by the crystal and the convergent beam from the first crystal may be measured by a vernier scale. The second crystal may also be moved so that the two circles 15, 19 which are established by the radius of curvature of the two crystals meet at the point E where the $K\alpha$ lines of the X-rays passing through the first crystal would be focussed if the second crystal were not in the way.

A specimen and film holder 22 is then placed so that a specimen 24 held at one wall thereof intercepts the X-rays which have passed through the second crystal. The specimen and film holder 22 is a well-known device in X-ray spectroscopy, essentially comprising a closed circular chamber having provision at one end for holding the specimen 24 with a predetermined angle with respect to the impinging X-rays and a film 26 is held pressed against the opposite wall to photograph the X-rays diffracted through the specimen 24. In order to provide extremely sharp and clear zero angle lines on the film, the specimen is positioned to make an angle of 45° to the plane of the beam of X-rays. In order to obtain improved ultra small angle scattering results, it is preferable to maintain the second crystal cool by passing cooling gas across it, from a source 28 through a nozzle 30. This cooling gas may be any one of the inert gases which maintain the temperature of the second crystal about zero degrees C.

In an embodiment of this invention which was built, a diffraction pattern of anthracene was obtained with 35 kilovolts at 25 milliamperes being applied to the camera which was four inches in diameter and ten hours of exposure time. Background blackening of the film was reduced to a minimum. As a matter of fact, patterns of lithium fluoride powders which were taken with exposures of six and one hundred hours did not show any measurable background above that of an unexposed film.

There has accordingly been described and shown a novel, useful improvement in X-ray diffraction apparatus which uses two curved monochromator crystals in the transmitted beam of X-rays from the X-ray source to the specimen whereby superior results are obtained.

What is claimed is:

1. In a system for obtaining an X-ray diffraction pattern of a specimen with X-rays from a source, the improvement comprising a first monochromator crystal having a first predetermined curvature, means for holding said first crystal adjacent said source of X-rays for diffracting X-rays from said source, a second monochromator crystal having a curvature greater than said first predetermined curvature, means for holding said second monochromator crystal in the path of X-rays which pass through said first crystal, and means positioning said specimen in the path of X-rays passing through said second crystal.

2. The improvement as recited in claim 1 wherein said first and second crystals are made of quartz which has been cut along the $10\bar{1}1$ plane, and said second crystal is positioned relative to said first crystal on the periphery of a first imaginary circle having the radius of curvature of said second crystal, where said periphery intersects with the periphery of a second imaginary circle having the same radius as said first imaginary circle, said second imaginary circle center being on a line extending perpendicular to said first crystal at the location through which said X-rays pass, and to which second imaginary circle said first crystal is tangent.

3. The improvement as recited in claim 1 wherein there is included coolant means for cooling said second crystal for minimizing thermal diffuse scattering of X-rays.

4. In a system as recited in claim 1 wherein said second crystal has the curvature of a circle with a radius which is substantially one-half of the radius of a circle having said predetermined curvature.

5. In apparatus as recited in claim 1 wherein said means for holding said specimen in the path of X-rays passing through said second crystal holds said specimen to make an angle of 45° with the plane of said beam of X-rays.

6. In a system for obtaining an X-ray diffraction pattern of a specimen with X-rays from a source, the improvement comprising a first monochromator crystal having a first predetermined curvature, means for holding said first crystal adjacent said source of X-rays for diffracting X-rays from said source, a second monochromator crystal having a curvature greater than said first predetermined curvature, means for holding said second monochromator crystal in the path of X-rays which pass through said first crystal, means positioning said specimen in the path of X-rays passing through said second crystal, a source of a coolant gas, and means for directing coolant gas from said source at said second crystal.

References Cited

FOREIGN PATENTS 1,124,720  3/1962  Germany.

OTHER REFERENCES

Elements of X-ray Diffraction, Cullity, Addison-Wesley Publishing Co., Inc., Reading, Mass., 1956 pp. 168–172.

RALPH G. NILSON, *Primary Examiner.*

ARCHIE R. BORCHELT, *Examiner.*

A. L. BIRCH, *Assistant Examiner.*